(12) United States Patent
Kang

(10) Patent No.: US 7,088,542 B2
(45) Date of Patent: Aug. 8, 2006

(54) COMPUTER SYSTEM AND METHOD TO CONTROL NOISE OF A HARD DISK DRIVE

(75) Inventor: Eun-jin Kang, Suwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 168 days.

(21) Appl. No.: 10/823,656

(22) Filed: Apr. 14, 2004

(65) Prior Publication Data

US 2004/0246615 A1    Dec. 9, 2004

(30) Foreign Application Priority Data

Jun. 3, 2003 (KR) ........................ 10-2003-0035624

(51) Int. Cl.
*G11B 19/28* (2006.01)
(52) U.S. Cl. .................................... 360/73.03
(58) Field of Classification Search ............... None
See application file for complete search history.

(56) References Cited

U.S. PATENT DOCUMENTS

| 6,411,457 | B1 * | 6/2002 | Yamashita et al. ........ 360/73.03 |
| 2001/0052035 | A1 * | 12/2001 | Singer et al. ................. 710/5 |
| 2003/0161236 | A1 * | 8/2003 | Wakui ...................... 369/47.46 |
| 2005/0008341 | A1 * | 1/2005 | Yada et al. ................. 386/113 |
| 2005/0146806 | A1 * | 7/2005 | Koizumi et al. .............. 360/69 |

FOREIGN PATENT DOCUMENTS

| JP | 3-123957 | 5/1991 |
| JP | 2001-202690 | 7/2001 |
| KR | 10-162483 | 6/1998 |
| KR | 1998-059215 | 10/1998 |
| KR | 20-197263 | 9/2000 |
| KR | 2002-68857 | 8/2002 |
| KR | 2003-8060 | 1/2003 |

OTHER PUBLICATIONS

Office Action issued by the Japanese Patent Office on Sep. 13, 2005.
Office Action issued by Korean Patent Office on Jan 28, 2005.
Abstract of Korean Patent No. 10-162483.

* cited by examiner

*Primary Examiner*—K. Wong
*Assistant Examiner*—James L Habermehl
(74) *Attorney, Agent, or Firm*—Staas & Halsey LLP

(57) ABSTRACT

A computer system including a computer main body provided with a hard disk drive (HDD) to retrieve/store data and an HDD driver to drive the hard disk drive to rotate at a predetermined rotational speed, further including a lower noise mode selection part allowing a user to select one between a normal mode and a lower noise mode; and a controller to control the HDD driver to drive the hard disk drive to rotate at a maximum speed when the normal mode is selected and at a minimum speed when the lower noise mode is selected. With this configuration, the present invention provides a computer system and a control method thereof, in which a hard disk drive can be set to a lower noise mode by a user.

21 Claims, 6 Drawing Sheets

| DATA | CLUSTER TO STORE NEXT DATA |
|------|---------------------------|
| A | E |
| E | I |
| I | M |
| ⋮ | ⋮ |

| DATA | CLUSTER TO STORE NEXT DATA |
|------|----------------------------|
| A    | D                          |
| D    | G                          |
| G    | J                          |
| ⋮    | ⋮                          |

| DATA | CLUSTER TO STORE NEXT DATA |
|---|---|
| A | E |
| E | I |
| I | M |
| ⋮ | ⋮ |

COMPUTER SYSTEM AND METHOD TO CONTROL NOISE OF A HARD DISK DRIVE

CROSS-REFERENCE TO RELATED APPLICATIONS

This application claims the benefit of Korean Patent Application 2003-35624, filed Jun. 3, 2003, in the Korean Intellectual Property Office, the disclosure of which is incorporated herein by reference.

BACKGROUND OF THE INVENTION

1. Field of the Invention

The present invention relates to a computer system and a control method thereof, and more particularly, to a computer system and a control method thereof, in which a hard disk drive can be set to a lower noise mode by a user.

2. Description of the Related Art

While a computer system operates, noise is mainly generated by a cooling fan cooling hardware components placed inside a computer main body, a hard disk drive (HDD) used as a data storage and reading/writing data, a CD-ROM (compact disc read only memory) drive reading data from a CD, a speaker, etc.

Therefore, various methods have been proposed for decreasing the noise due to the hard disk drive, the CD-ROM, the cooling fan, etc.

In particular, to decrease the noise of the hard disk drive placed inside or outside of the computer main body, a user interface window is employed as shown in FIG. 1, which display s the method of managing power of the hard disk drive. Here, the user interface window of FIG. 1 is taken from Windows XP among affiliated Windows operating systems (OS).

A conventional process for decreasing the noise of the hard disk drive is as follows. First, a user opens a "Control Panel" window in the Windows XP (or affiliated Windows operating system) to set the hard disk drive to be automatically turned off when a predetermined time passes after the hard disk drive is not used. In the "Control Panel" window, a user clicks on a "Power Options" icon, thereby opening "Power Options Properties" window. In the "Power Options Properties" window, a user selects a "Power Schemes" tab, and selects a "Settings for Always On" power scheme option, so that the user interface window of FIG. 1 is displayed.

Then, a user sets a "Turn off hard disks" option to a desired time (in FIG. 1, "After 3 mins" is set by way of example), and clicks an "Apply" or "OK" button. At this time, data regarding a hard disk turn-off time, which is set in the "Turn off hard disks" option, is stored in a registry so that the above setting is implemented when the "Apply" or "OK" button is clicked or after the computer system is rebooted.

However, in such a conventional method for decreasing the noise of the hard disk drive by turning off its power, the noise decrement is only an accompanying effect of managing the power of the hard disk drive. Furthermore, the setting process is inconvenient for a user to set due to its complexity.

The hard disk drive has a rotational speed measured in revolutions per minute (RPM), which is a measure of how fast a hard disk drive retrieves data therefrom and stores data thereto. The higher the RPM, the faster the hard disk drive retrieves and stores the data. Traditionally, hard disk drives have had a rotational speed of 3,600 RPM. However, 4,500 RPM, 5,400 RPM, 7,200 RPM, and 10,000 or more RPM are now available.

The RPM of the hard disk drive is set when the hard disk drive is manufactured; therefore, a user cannot adjust the RPM. Furthermore, during normal operation of the computer system, the hard disk drive continuously rotates at its invariable RPM regardless of whether the hard disk drive is used or not, so that the noise is generated even when the hard disk drive is not used.

SUMMARY OF THE INVENTION

Accordingly, it is an aspect of the present invention to provide a computer system and a control method thereof, in which a hard disk drive can be set to a lower noise mode by a user.

Additional aspects and advantages of the invention will be set forth in part in the description that follows and, in part, will be obvious from the description, or may be learned by practice of the invention.

The foregoing and/or other aspects of the present invention are achieved by providing a computer system comprising a computer main body provided with a hard disk drive (HDD) to retrieve/store data and an HDD driver to drive the hard disk drive to rotate at a predetermined rotational speed, the computer system further comprising a lower noise mode selection part allowing a user to select one between a normal mode and a lower noise mode; and a controller to control the HDD driver to drive the hard disk drive to rotate at a maximum speed when the normal mode is selected and at a minimum speed when the lower noise mode is selected.

According to an aspect of the invention, in the case where the lower noise mode is selected, the controller controls the hard disk drive to rotate at a data processing speed, which is faster than the minimum speed and slower than the maximum speed, on the basis of an external data processing signal.

According to an aspect of the invention, the hard disk drive includes location information on where data is located, and uses the same location information regardless of the maximum speed and the data processing speed.

According to an aspect of the invention, the location information includes one file allocation table (FAT).

According to an aspect of the invention, the lower noise mode selection part is implemented by a predetermined application program or a hot key.

According to another aspect of the present invention, the above and/or other aspects may be also achieved by providing a method of controlling a computer system comprising a computer main body provided with a hard disk drive (HDD) to retrieve/store data and an HDD driver to drive the hard disk drive to rotate at a predetermined rotational speed, the method further comprising: selecting one between a normal mode and a lower noise mode; and controlling the HDD driver to drive the hard disk drive to rotate at a maximum speed when the normal mode is selected and at a minimum speed when the lower noise mode is selected.

According to an aspect of the invention, the method further comprises controlling the hard disk drive to rotate at a data processing speed, which is faster than the minimum speed and slower than the maximum speed, on the basis of an external data processing signal in the case where the lower noise mode is selected.

BRIEF DESCRIPTION OF THE DRAWINGS

These and/or other aspects and advantages of the present invention will become apparent and more readily appreciated from the following description of the embodiments, taken in the attached drawings in which.

DETAILED DESCRIPTION OF THE PREFERRED EMBODIMENTS

Figure 1:
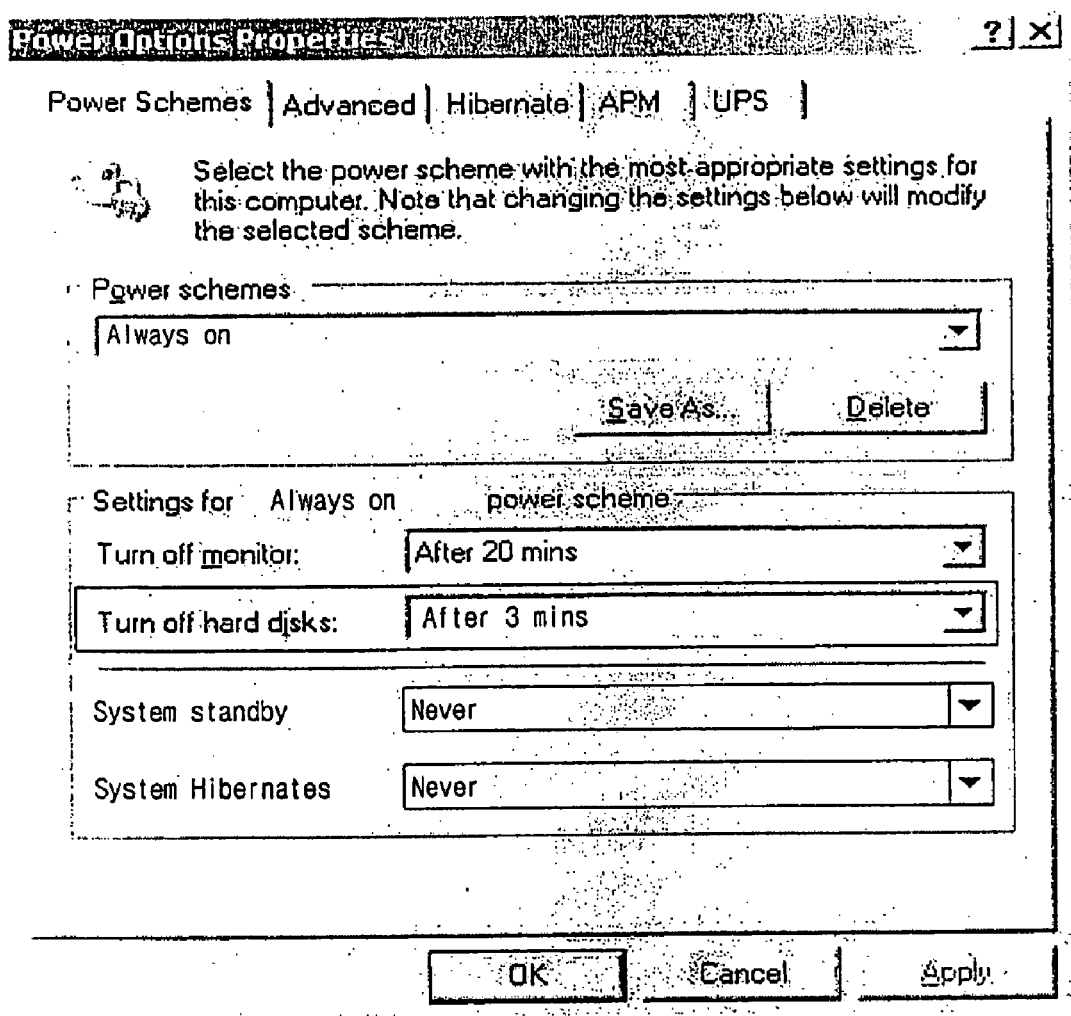
FIG. 1 is an illustration of an user interface window in a conventional computer system, through which noise can be decreased by managing power of a hard disk drive.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 3:
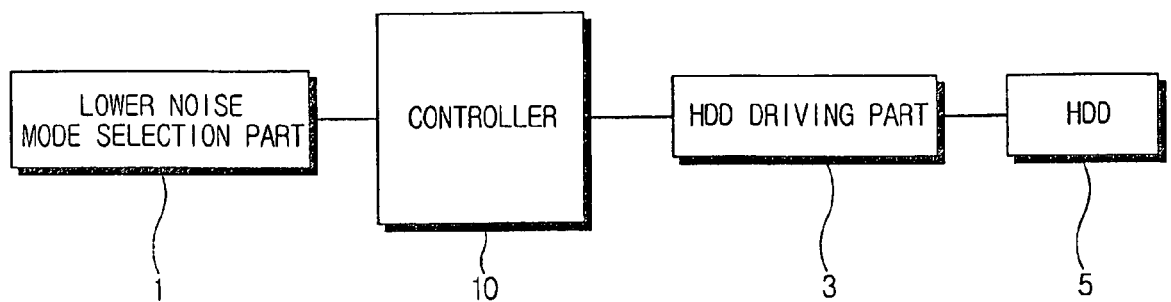
FIG. 3 is a control block diagram of a computer system according to an embodiment of the present invention.

FIG. 3 is a control block diagram of a computer system according to an embodiment of the present invention. As shown in FIG. 3, a computer system according to the present invention comprises a hard disk drive (HDD) 5 to retrieve/store data, an HDD driver 3 to drive the hard disk drive 5 to rotate at a predetermined rotational speed, a lower noise mode selection part 1 to select one between a normal mode and a lower noise mode, and a controller 10 to control the hard disk drive 5 to rotate at a maximum speed when the normal mode is selected and at a minimum speed when the lower noise mode is selected.

The hard disk drive 5 retrieves data thereto and stores data therefrom. Generally, the hard disk drive comprises a plurality of platters coated with magnetic material to store data, a spindle about which the platters rotate, and a head to read data from the platters and to write data to the platters.

The HDD driver 3 comprises an HDD driving motor to rotate the spindle and HDD controller to read data from the platter being rotated, to determine a rotational speed (RPM) of the platter, and to control the head in response to data request signals from peripheral hardware components. In this embodiment, the HDD driving motor rotates at various speeds in response to a predetermined control signal, wherein the various speeds include a booting speed, the maximum speed, a data processing speed that is slower than the maximum speed, and the minimum speed.

Generally, in the HDD driver 3, the HDD controller generates a predetermined pulse signal and the HDD driving motor rotates corresponding to the pulse signal. Thus, the rotational speed of the HDD driving motor is controlled.

Here, the HDD controller 10 determines whether or not basic files required for an operating system (OS) are loaded into a memory when the rotational speed of the platter reaches the booting speed. When it is determined that the basic files are loaded into the memory, the HDD controller stops reading the data and accelerates the rotational speed of the HDD driving motor to the maximum speed. When the rotational speed of the HDD driving motor reaches the maximum speed, the hard disk drive 5 is in the normal mode, so that a user can normally use the computer system.

The minimum speed represents an optimum speed (e.g., 1,000 RPM) at which the hard disk drive operates with the minimum noise and minimum power consumption in the lower noise mode. However, the minimum speed is not limited to 1,000 RPM and can be changed in consideration of various conditions of the hard disk drive or the computer system.

The data processing speed represents an optimum speed at which the hard disk drive data can be processed without delay in the lower noise mode. In this embodiment, the data processing speed is 3,600 RPM. However, the data processing speed is not limited to 3,600 RPM and can be any speed as long as data processing is not obviously delayed in comparison with data processing in the normal mode.

The platter is divided into a plurality of concentric circles, called tracks, and each track is divided into a plurality of sectors.

A sector is the smallest unit of storage that is addressable, so that data can be written thereto or read therefrom in the sector. Typically, the sector is 256 or 512 bytes in length. Thus, the data can be retrieved by finding a sector number and a track number.

The sector 0 of the hard disk drive contains a file allocation table (FAT). A FAT stores the locations of directories or files and also stores information on how clusters are used.

A cluster is a logical unit of file storage. The file stored on the hard disk drive occupies at least one cluster, i.e., a large-sized file can be stored in several clusters. Here, the clusters associated with one file are not necessarily sequenced and can be scattered among different locations on the hard disk drive. In this case, the locations of the several clusters associated with one file are kept in the FAT of the hard disk drive.

Figure 2A:
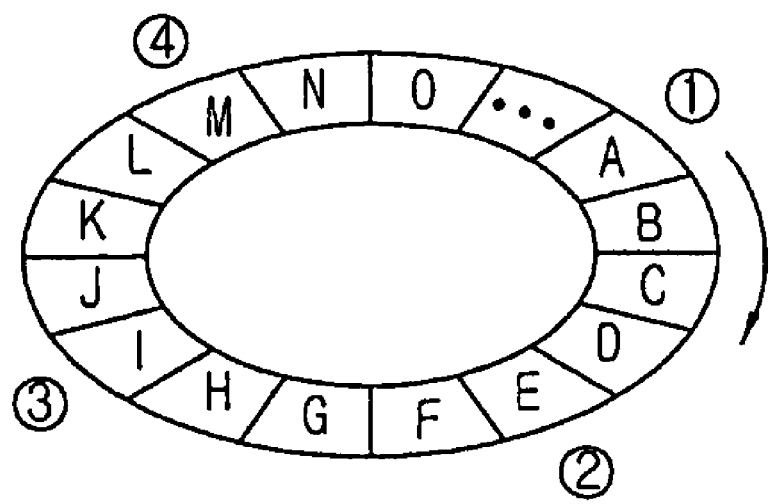
FIGS. 2A and 2B are illustrations of a storage structure of the conventional hard disk drive.
Figure 2B:
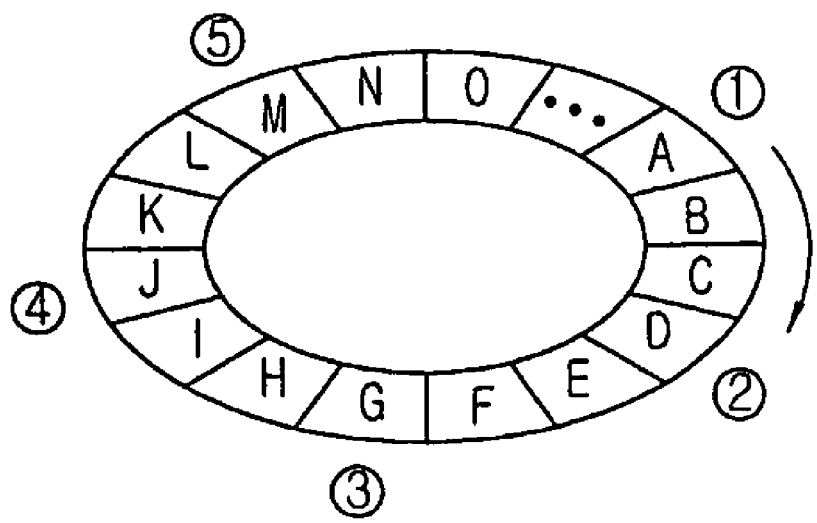

FIG. 2A is an illustration of a storage structure of a conventional hard disk drive having a relatively fast rotational speed (e.g., 7,200 RPM). FIG. 2B is an illustration of the conventional storage structure of the hard disk drive having a relatively slow rotational speed (e.g., 3,600 RPM). Hereinbelow, the storage structure of the conventional hard disk drive will be described with reference to FIG. 2A.

In FIG. 2A, a ring schematically shows the track, and segments within the ring show the clusters to store data about file. Here, the data is not necessarily sequenced within one track of the platter and can be scattered among different tracks.

Suppose that the hard disk drive rotates in a direction of an arrow shown in FIG. 2A, and data writing is started at an "A" cluster and then skipped to an "E" cluster because of the rotational speed of the hard disk drive and a moving speed of the head. Then, an "I" cluster and an "M" cluster are accessed in sequence.

When the data is written on the hard disk drive, if one or more clusters are needed because the data of one file is too large to be stored in one cluster, then information is needed for the allocation of data segments.

In FIG. 2A, a table describes the FAT having information on where the data segment and the next data segment are located on the hard disk drive.

Similarly, FIG. 2B is an illustration of the storage structure of the conventional hard disk drive having a rotational speed relatively slower than that of FIG. 2A. Hence, the data writing is started at the "A" cluster and then skipped to an "D" cluster, being closer than the "E" cluster. Also, a "G"

cluster and a "J" cluster are accessed in sequence, wherein the "G" and the "J" clusters are closer than the "I" and "M" clusters, respectively.

As described above, the location information of the clusters associated with one file, which is stored in the FAT, varies according to the rotational speed of the hard disk drive.

Figure 4:
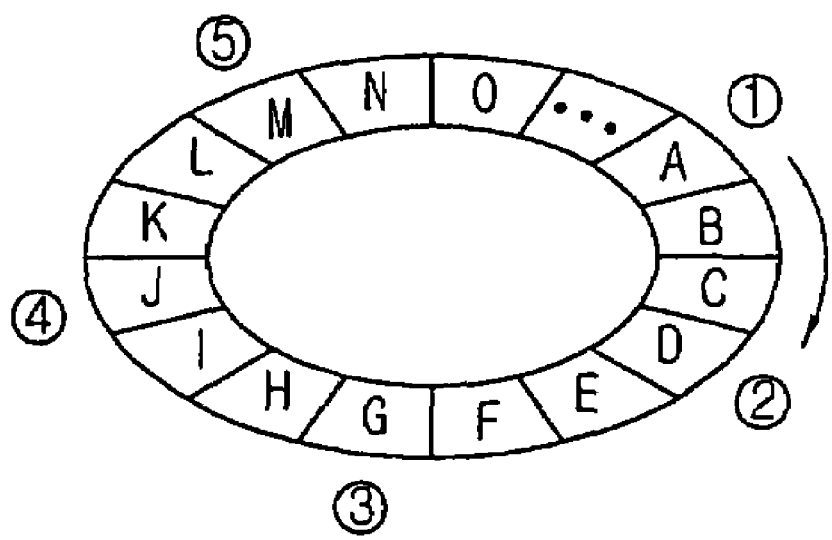
FIG. 4 is an illustration of a storage structure of a hard disk drive according to an embodiment of the present invention.

FIG. 4 is an illustration of a storage structure of the hard disk drive according to an embodiment of the present invention. In this embodiment, the data processing speed is equal to the rotational speed (e.g., 3,600 RPM) of the conventional hard disk drive in FIG. 2B, so that data is accessed at the same speed of the FIG. 2B.

However, the hard disk drive according to the present invention uses the FAT of the maximum speed while operating in the data processing speed. In this embodiment, the hard disk drive has the maximum speed equal to the rotational speed (e.g., 7,200 RPM) of the conventional hard disk drive in FIG. 2A, so that the hard disk drive according to the present invention uses the same FAT of FIG. 2A. Thus, the hard disk drive according to the present invention uses one FAT regardless of the rotational speed such as the maximum speed and the data processing speed.

Accordingly, in the case where the hard disk drive rotates at the data processing speed, the head may not reach the cluster containing the next data segment, thereby delaying a data process. Here, even though the data, such as a moving picture, should be processed for a relatively long period of time, the data can be processed without difficulty, so that the delay of the data process is negligible.

On the other hand, the lower noise mode selection part 1 allows a user to select between the normal mode and the lower noise mode. The normal mode represents that the hard disk drive rotates at the maximum speed. The lower noise mode represents that the hard disk drive rotates at the rotational speed slower than the maximum speed in order to decrease the noise.

The lower noise mode selection part 1 can also be implemented by a predetermined application program, wherein the application program displays a user interface window having a lower noise mode selection button and a lower noise mode release button. The application program may also display an input window to allow a user to freely set the minimum speed and the data processing speed. The lower noise mode selection part 1 can be simply implemented by keyboard shortcuts, or hot keys, wherein the hot keys correspond to the lower noise mode selection and the lower noise mode release, respectively.

When a user selects a predetermined button or a predetermined hot key through the lower noise mode selection part 1, a mode selection signal corresponding to the button or the hot key is generated.

The controller 10 receives the mode selection signals corresponding to the modes selected by a user through the lower noise mode selection part 1 and a data processing signal from the peripheral hardware component, and controls the hard disk drive 5 to rotate. Here, the data processing signal is used for controlling the hard disk drive to retrieve the data stored therein and to store the data.

The normal mode selection signal, the data processing signal and the lower noise mode selection signal are different from each other in pulse frequency. Information on each pulse frequency is stored in a memory (not shown) of the controller 10.

The HDD driver 3 operates on the basis of the control signal from the controller 10, wherein the control signal corresponds to the mode selection signal or the data processing signal. That is, the HDD driver 3 adjusts the rotational speed of the spindle on the basis of the pulse frequency corresponding to the normal mode selection signal, the data processing signal or the lower noise mode selection signal. Here, the pulse frequency of the normal mode selection signal is shorter than that of the data processing signal, and the pulse frequency of the data processing signal is shorter than that of the lower noise mode selection signal, wherein the normal mode selection signal, the data processing signal and the lower noise mode selection signal correspond to the maximum speed, the data processing speed and the minimum speed, respectively.

Figure 5:
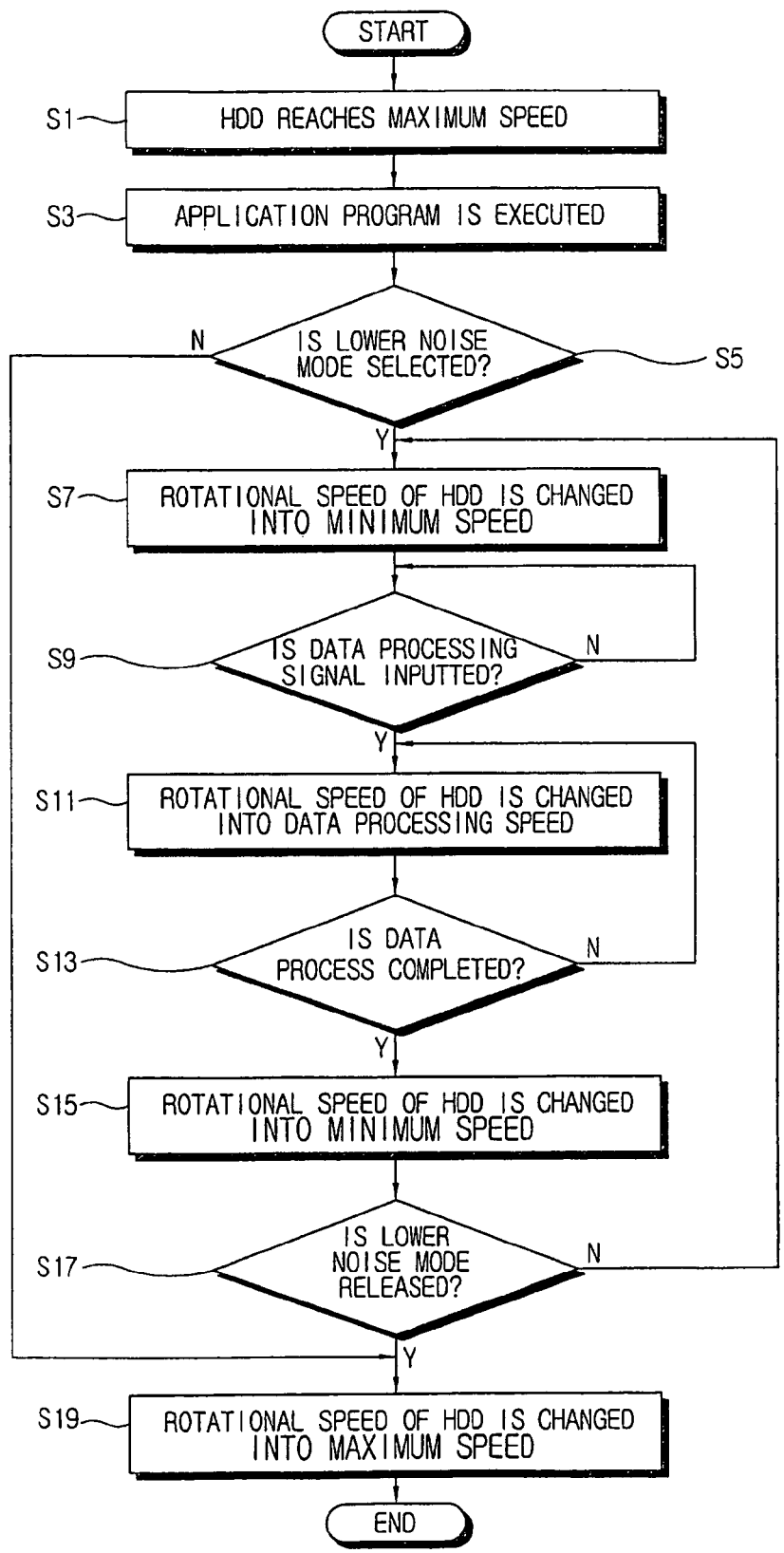
FIG. 5 is a flowchart describing the control of the hard disk drive according to an embodiment of the present invention.

FIG. 5 is a flowchart describing the control of the hard disk drive according to the present invention. As shown therein, at operation S1, the hard disk drive reaches the maximum speed of the normal mode when the computer system is completely booted. Thereafter, at operation S3, the application program is executed to implement the lower noise mode. At operation S5, the lower noise mode is selected and the lower noise mode selection signal corresponding to the lower noise mode is transmitted to the controller 10. The controller 10 then controls the HDD driver 3 to generate a pulse signal corresponding to the lower noise mode, so that, at operation S7, the rotational speed of the hard disk drive is changed from the maximum speed into the minimum speed.

When the hard disk drive rotates at the minimum speed, the noise due to the minimum speed of the hard disk drive is lower than that due to the maximum speed, so that the noise is decreased.

On the other hand, at operation S5, in the case where the lower noise mode is not selected, the hard disk drive maintains the normal mode and rotates at the maximum speed.

Furthermore, in the lower noise mode, if a user wants to process data of the hard disk drive through application programs or the like, the rotational speed of the hard disk drive should be increased so as to process the data.

At operation S9, if the data processing signal is inputted from the peripheral hardware components in the case of the lower noise mode, the data processing signal is transmitted to the controller 10. The controller 10 then controls the HDD driver 3 to generate a pulse signal corresponding to the data processing signal, so that, at operation S11, the rotational speed of the hard disk drive is changed from the minimum speed into the data processing speed.

In order to decrease the noise and time required to prepare for the data process, it is better to increase the rotational speed of the present hard disk drive from when it is rotating at the minimum speed than to increase the rotational speed of the conventional hard disk drive to a maximum speed from when it is not rotating.

Further, according to the present invention, the rotational speed of the hard disk drive is increased to the data processing speed, not the maximum speed. In the lower noise mode, the hard disk drive operates at the data processing speed so as to minimize the noise.

On the other hand, at operation S9, if the data processing signal is not inputted in the case of the lower noise mode, the hard disk drive maintains the lower noise mode and rotates at the minimum speed.

As described above, the hard disk drive rotates at the maximum speed in the normal mode and rotates at the data processing speed when the data processing signal is inputted by a user while rotating at the minimum speed in the lower noise mode.

Thereafter, at operation S13, if the data process is completed, then the rotational speed of the hard disk drive is returned to the minimum speed at operation S15.

On the other hand, at operation S17, if a user releases the hard disk drive from the lower noise mode, then the hard disk drive is returned to the normal mode and rotates at the maximum speed at operation S19.

With this configuration, a user can select the lower noise mode through the application program and the noise due to the rotation of the hard disk drive is decreased in the lower noise mode, thereby providing a relatively quiet computer system.

As described above, the present invention provides a computer system and a control method thereof, in which a hard disk drive can be set to a lower noise mode by a user.

Although a few embodiments of the present invention have been shown and described, it will be appreciated by those skilled in the art that changes may be made in these embodiments without departing from the principles and spirit of the invention, the scope of which is defined in the appended claims and their equivalents.

The invention claimed is:

1. A computer system comprising a computer main body having a hard disk drive to retrieve/store data and a hard disk drive driver to drive the hard disk drive to rotate at a predetermined rotational speed, the computer system further comprising:

a lower noise mode selection part to allow a user to select either a normal mode or a lower noise mode; and a controller to control the hard disk drive driver to drive the hard disk drive to rotate at a maximum speed when the normal mode is selected and at a minimum speed when the lower noise mode is selected, wherein when the lower noise mode is selected, the controller controls the hard disk drive to rotate at a data processing speed, which is faster than the minimum speed and slower than the maximum speed, on the basis of an external data processing signal.

2. The computer system according to claim 1, wherein the hard disk drive includes location information on data and uses the location information regardless of the maximum speed and the data processing speed.

3. The computer system according to claim 2, wherein the location information includes a file allocation table.

4. The computer system according to claim 1, wherein the lower noise mode selection part is implemented by a predetermined application program or a hot key.

5. A method of controlling a computer system comprising a computer main body having a hard disk drive to retrieve/store data and a hard disk drive driver to drive the hard disk drive to rotate at a predetermined rotational speed, the method comprising:

selecting either a normal mode or a lower noise mode;

controlling the hard disk drive driver to drive the hard disk drive to rotate at a maximum speed when the normal mode is selected and at a minimum speed when the lower noise mode is selected; and controlling the hard disk drive to rotate at a data processing speed, which is faster than the minimum speed and slower than the maximum speed, on the basis of an external data processing signal when the lower noise mode is selected.

6. A method for controlling a noise level of a hard disk drive, comprising:

selecting between a lower noise mode and a normal noise mode;

decreasing the rotational speed of the hard disk drive to a minimum rotational speed if the lower noise mode is selected;

maintaining the rotational speed of the hard disk drive at a maximum rotational speed if the normal noise mode is selected; and increasing the rotational speed of the hard disk drive from the minimum rotational speed to a data processing rotational speed if the lower noise mode is selected and a data process signal is inputted into the hard disk drive.

7. The method according to claim 6, further comprising decreasing the rotational speed of the hard disk drive from the data processing rotational speed to the minimum rotational speed when the data process is completed.

8. The method according to claim 6, further comprising increasing the rotational speed of the hard disk drive to the maximum rotational speed when the lower noise mode selection is released.

9. The method according to claim 6, wherein the data processing rotational speed of the hard disk drive is approximately 3,600 RPM.

10. The method according to claim 6, wherein the minimum rotational speed of the hard disk drive is less than the data processing rotational speed of the hard disk drive.

11. The method according to claim 6, wherein the maximum rotational speed of the hard disk drive is at least 7,200 RPM.

12. The method according to claim 6, wherein the lower noise mode selection and the normal noise mode selection are implemented by a predetermined application program or a hot key.

13. An apparatus to control a noise level of a hard disk drive, comprising:

a noise mode selection device to allow a user to switch between a lower noise mode and a normal noise mode; and a control device to control the hard disk drive to rotate at a minimum rotational speed if the lower noise mode is selected, a maximum rotational speed if the lower noise mode is not selected, and a data processing rotational speed if a data processing signal is inputted into the control device and the lower noise mode is selected.

14. The apparatus according to claim 13, wherein the control device controls the hard disk drive to increase the rotational speed of the hard disk drive from the minimum rotational speed to the data processing rotational speed when the data process signal is inputted into the control device and the lower noise mode is selected in order to reduce a noise level of the hard disk drive and to decrease a time duration required to prepare for the data process.

15. The apparatus according to claim 14, wherein the control device controls the hard disk drive to decrease the rotational speed of the hard disk drive to the minimum rotational speed when the data process is completed in order to decrease the noise level of the hard disk drive.

16. The apparatus according to claim 13, wherein the hard disk drive contains a single file allocation table to store information on where a directory or a file is located regardless of the rotational speed of the hard disk drive in order to reduce the delay of the data process.

17. The apparatus according to claim 16, wherein the file allocation table contains information relating to the maximum rotational speed of the hard disk drive.

18. The apparatus according to claim 13, wherein the data processing rotational speed of the hard disk drive is approximately 3,600 RPM.

19. The apparatus according to claim 18, wherein the minimum rotational speed of the hard disk drive is less than the data processing rotational speed of the hard disk drive.

20. The apparatus according to claim 13, wherein the maximum rotational speed of the hard disk drive is at least 7,200 RPM.

21. The apparatus according to claim 13, wherein the lower noise mode selection and the normal noise mode selection are implemented by a predetermined application program or a hot key.

* * * * *